(12) United States Patent
Turner et al.

(10) Patent No.: US 7,194,107 B2
(45) Date of Patent: Mar. 20, 2007

(54) SYSTEM AND METHOD FOR AUGMENTED THERMAL IMAGERY

(75) Inventors: Robert W. Turner, Federal Way, WA (US); Pauline Joe, Renton, WA (US); Ingrid L. Criswell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 758 days.

(21) Appl. No.: 10/611,703

(22) Filed: Jun. 30, 2003

(65) Prior Publication Data

US 2004/0264804 A1 Dec. 30, 2004

(51) Int. Cl.
*G06K 9/00* (2006.01)

(52) U.S. Cl. ...................... 382/100; 382/276; 374/121

(58) Field of Classification Search ................ 382/100, 382/191, 254, 276; 374/1, 4, 5, 7, 10, 14, 374/15, 20, 30, 33, 40, 45, 57, 121, 124, 374/168, 169, 175; 73/295, 442, 449; 430/364, 430/367, 402

See application file for complete search history.

(56) References Cited

U.S. PATENT DOCUMENTS

| 4,313,678 A | * | 2/1982 | Colvocoresses | 356/2 |
| 4,864,127 A | * | 9/1989 | Brame | 250/253 |
| 6,937,774 B1 | * | 8/2005 | Specht et al. | 382/254 |

* cited by examiner

*Primary Examiner*—Matthew C. Bella
*Assistant Examiner*—Abolfazi Tabatabai
(74) *Attorney, Agent, or Firm*—Lee & Hayes, PLLC

(57) ABSTRACT

The present invention provides a system, method, and computer program for generating an image based on thermal data. The invention receives an array of pan band data having units of data in a first resolution, converts the received pan band data into a radiance value, and converts the radiance value into a power value. An array of thermal band data is received that has units of data in a second resolution. The received thermal band data is converted into a temperature value and the resolution of the temperature value is changed to match the resolution of the received pan band data. A color array is generated based on the received array of the pan band data and the array of the changed thermal band data. The color array, includes units having red, green, and blue values. An image is generated based on the generated color array.

32 Claims, 3 Drawing Sheets

SYSTEM AND METHOD FOR AUGMENTED THERMAL IMAGERY

COPENDING APPLICATIONS

This application is copending with U.S. patent application Ser. No. 10/611,702, and U.S. patent application Ser. No. 10/611,757, all filed Jun. 30, 2003 and all are hereby incorporated by reference.

FIELD OF THE INVENTION

This invention relates generally to imaging systems and methods and, more particularly, to thermal imaging systems and methods.

BACKGROUND OF THE INVENTION

Airborne and satellite remote thermal sensing of the ground has been widely used for various change detection applications, such as agriculture. The remote sensors detect differences in temperature across the surface of the earth. The sensed temperatures are then converted into images used by the change detection applications. FIG. 1 illustrates an example image generated by prior art remote sensing systems. The image in FIG. 1 is a resized or zoomed-in view produced by a Land Remote Sensing Satellite Program (LANDSAT-7) satellite operated by NASA. The thermal images produced by prior known methods are useful primarily in low resolution applications.

It would be desirable to provide thermal images for high resolution applications. However, there exists an unmet need for generating remotely sensed thermal images at higher resolutions to provide more accurate interpretation of thermal data.

SUMMARY OF THE INVENTION

The present invention provides a system, method, and computer program for generating an image based on thermal data. Thermal data images produced by the present invention include a high degree of radiometric accuracy for use in various thermal image analysis applications.

According to exemplary embodiments of the present invention, an array of pan band data including units of data in a first resolution is received and converted into a radiance value. The radiance value pan band data is converted into a power value. An array of thermal band data that has units of data in a second resolution is received. The received thermal band data is converted into a temperature value and the spatial resolution of the temperature value thermal band data is changed to match the spatial resolution of the received pan band data. A color array is generated based on the received array of the pan band data and the array of the changed thermal band data. The color array includes units having red, green, and blue values. An image is generated based on the generated color array.

In one aspect of the invention, a red value for each unit is generated by adding a value of each corresponding unit in the pan band data to a value of each corresponding unit in the thermal band data. Green and blue values for each unit are generated by determining a mean or average temperature value for the received thermal band data and adding a value of each corresponding unit in the pan band data to the determined mean average temperature value.

In another aspect of the invention, the generated image is displayed on a display device or a hard copy device produced on a printing device.

BRIEF DESCRIPTION OF THE DRAWINGS

The preferred and alternative embodiments of the present invention are described in detail below with reference to the following drawings.

DETAILED DESCRIPTION OF THE INVENTION

Figure 2:
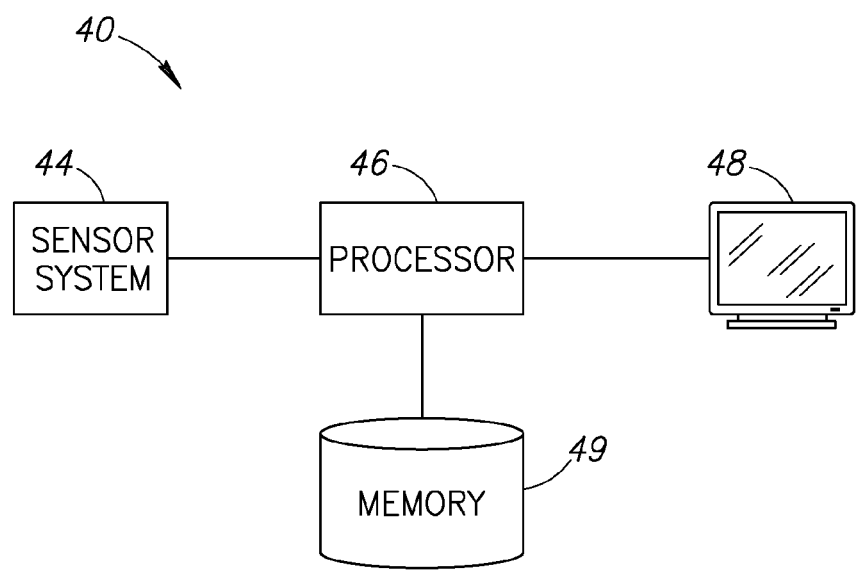
FIG. 2 is a block diagram of an example system formed in accordance with the present invention.

The present invention is a system, method, and computer program for generating thermal images from data received from a remote earth sensor system. FIG. 2 illustrates an exemplary system 40 for generating thermal images. The system 40 includes a sensor system 44, a processor 46, one or more display devices 48 or printing devices, and memory 49. The sensor system 44 provides panchromatic (pan) band data, which is electromagnetic radiation in the visible spectrum (0.4–0.7 micrometers), and thermal infrared (IR) band data, which is electromagnetic radiation having wavelengths between 3 and 25 micrometers. The processor 46 is coupled to the display device 48 and the memory 49. The processor 46 receives and processes the panchromatic band and thermal band data to produce an image for display on the display device 48.

In one embodiment the sensor system 44 is a Land Remote Sensing Satellite Program satellite (LANDSAT) system that generates multiple bands of data wherein each band is a collection of radiation from different ranges of the electromagnetic spectrum. Other sensor systems may be used.

Figure 3:
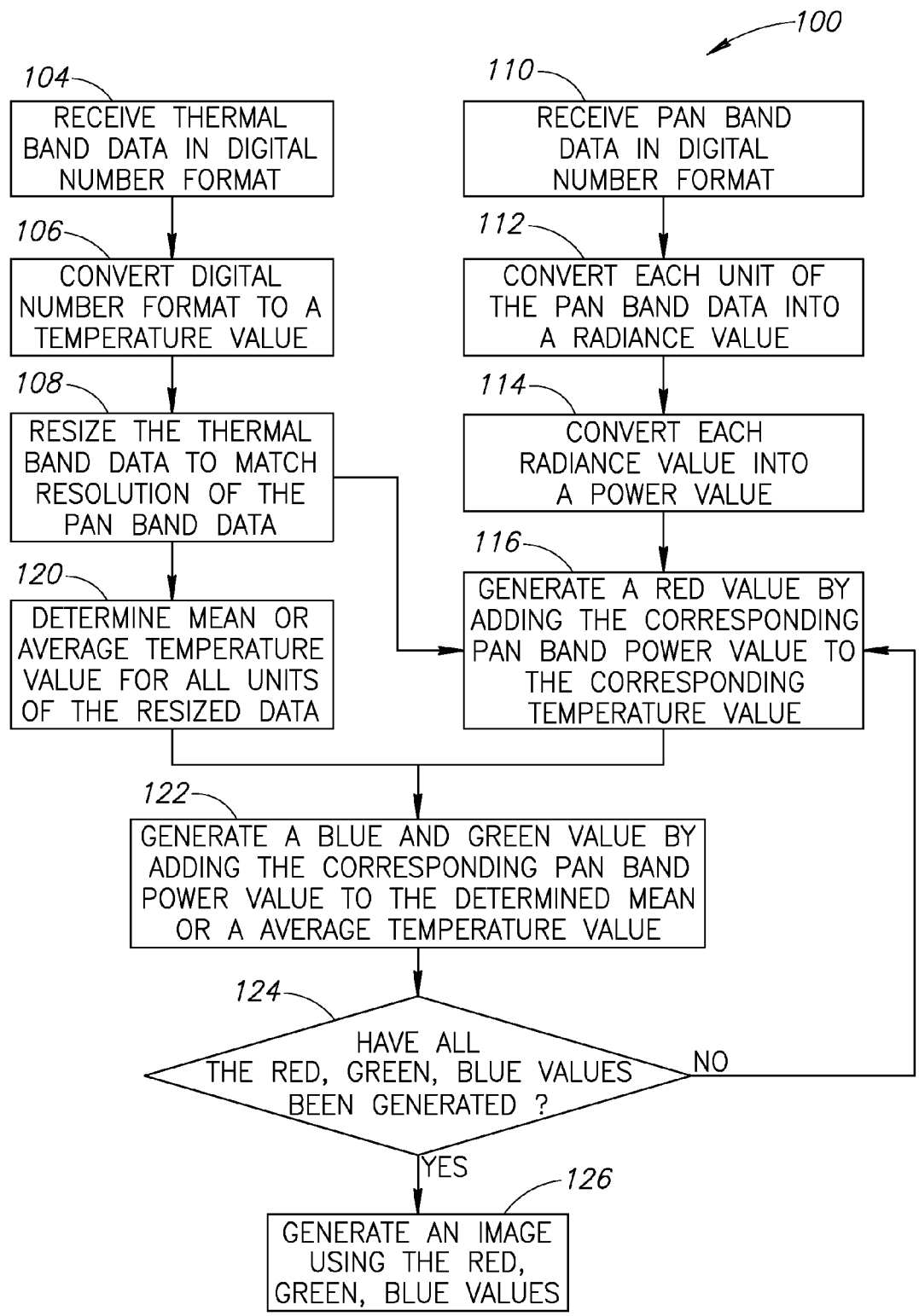
FIG. 3 is a flow diagram of an example process performed by the system shown in FIG. 2.

FIG. 3 illustrates an exemplary process 100 that is performed by the processor 46 in FIG. 2 for generating a thermal image for display on the display device 48. At a block 104, the processor 46 receives thermal band data from the sensor system 44. The thermal band includes units with associated data that are formatted in digital number format. At a block 106, each of the digital number formatted units of data is converted into a temperature value. Temperature conversion is done using equations supplied by the sensor system operator or manufacturer, such as NASA. In one non-limiting example, the data in digital number format is converted to a temperature value in the Kelvin scale, see below.

$$T = \frac{(K2)}{\ln\left(\frac{K1}{L} + 1\right)}$$

where
T=Effective at-satellite temperature in Kelvin
K2=Calibration constant 2 in Kelvin
K1=Calibration constant 1 in watts/(meter$^2$*sr*micron)
L=spectral radiance in watts/(meter$^2$*sr*micron)

At a block 108, the converted thermal band data are resized to match the same spatial resolution as that of the pan band data produced by the sensor system 44. If, for example, the sensor system 44 is a LANDSAT series system, the pan band is at a 15-meter resolution level and the thermal band data is at a 60-meter resolution level. In order to resize the thermal band data, each unit of data is split into eight subunits. Each subunit suitably has the same value as the original unit, thereby producing data at a 15-meter resolution level.

The processor 46 receives pan band data in digital number format at a block 110. At a block 112, each unit of the pan band data is converted into a radiance value. EQUATION (1) below illustrates an exemplary formula for converting the digitally formatted information into a radiance value.

$$L_T = \frac{(LMAX_T - LMAX_T)}{(qcal\max - qcal\min)} \times (qcal - qcal\min) + LMIN_T \quad (1)$$

where
$L_T$=spectral radiance in watts/(meter$^2$*sr*micron)
QCAL=quantized calibrated frame unit value in digital number (DN) format
QCALMIN=minimized quantized calibrated frame unit value in DN format
QCALMAX=maximum quantized calibrated frame unit value in DN format
$LMIN_T$=spectral radiance that is scaled to QCALMIN in watts/(meter$^2$*sr* micron)
$LMAX_T$=spectral radiance that is scaled to QCALMIN in watts/(meter$^2$*sr* micron)

At a block 114, each radiance value (R) is converted into a power value (P) according to EQUATION (2).

$$P = R \cdot (w_u - w_l) \quad (2)$$

EQUATION (2) above generates a power value for each unit based on corresponding a radiance value with an upper width limit $w_u$ and a lower width limit $w_l$ of the pan band. The upper and lower limits $w_u$ and $w_l$ of the pan band are adjusted based on test data. Using the spectral response of bands in the sensor system 44, an equivalent uniform response band width with upper limit $w_u$ and lower limit $w_l$ is calculated using normal practice of using equal relative response point left and right with a uniform amplitude equal to the peak of the measured relative response. Other similar operations can be used to determine and adjust power.

At a block 116, a red value is generated by adding the corresponding pan band power value, as determined in the block 114, to the corresponding temperature value, as determined in the block 108, for each unit. At a block 120, a mean or average temperature value is determined for the data of the resized units of the thermal band data. It will be appreciated that other resizing techniques can be used. At a block 122, blue and green values are generated by adding the corresponding pan band power value to the determined mean or average temperature value. The generated red, green, and blue pixel values are stored for later use. At a decision block 124, the process 100 determines whether the red, green, and blue values for all the units have been generated. If not all the pixel values have been generated, the process 100 returns to the block 116. If, at the decision block 124, all the red, green, and blue values have been generated, at a block 126, an image is generated using the generated red, green, and blue values. The generated image is then sent to the display device 48 for presentation. It will be appreciated that the generated red, green, and blue pixel values are applied to corresponding pixels on the display device 48 as determined by a display processor (e.g., processor 46).

Figure 4:
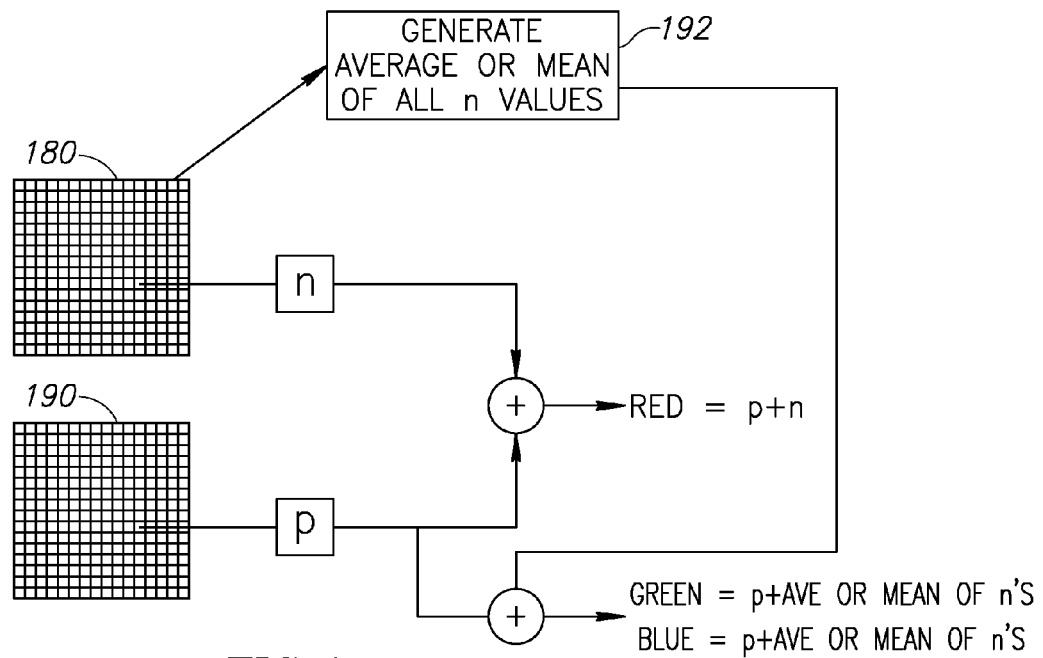
FIG. 4 illustrates how data from a thermal band is converted into color.

FIG. 4 illustrates exemplary processes as performed at the blocks 116 and 122 (FIG. 3). Values from an array of thermal data 180 are combined with data from an array of pan data 190 to generate red, green, and blue values that are then used for generating an image. A value n from a unit within the array of thermal data 180 is retrieved and added to a value p from a unit within the array of pan data 190 at the same location to produce the red value. At a block 192, all the values within the array of thermal data 180 are used to determine an average or mean for the array of thermal data 180. The generated average or mean is added to a value p from a unit within the array of pan data 190 to generate the green and blue values for that location associated with the unit within the array of pan data 190.

Figure 1:
FIG. 1 is a thermal image produced by a prior art method.
Figure 5:
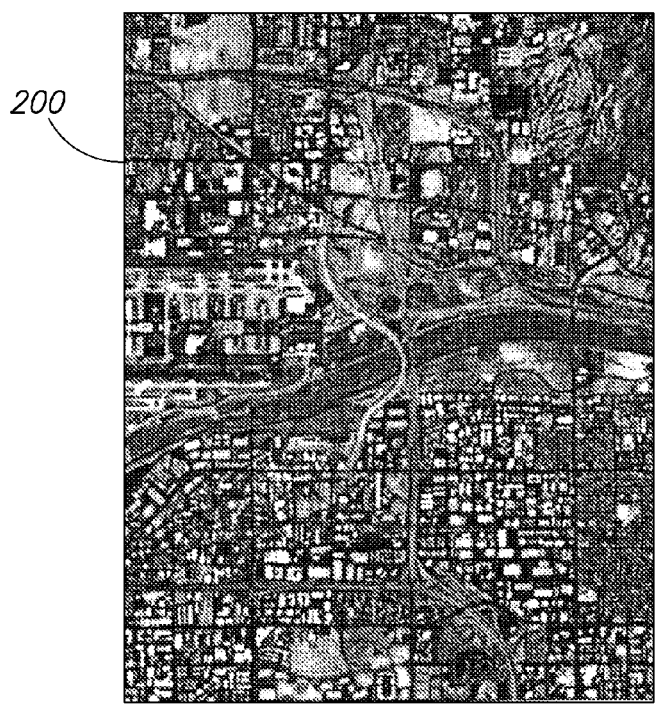
FIG. 5 is a thermal image produced by the process shown in FIG. 3.

FIG. 5 illustrates an example image 200 produced by the process 100 shown in FIG. 3. FIG. 5 is an image of the same land area as shown in FIG. 1. According to the present invention, the level of detail of the resulting image in FIG. 5 advantageously is much more detailed than the prior art image generated from thermal band data (FIG. 1). While images shown in FIGS. 1 and 5 are black and white images, each are created with color for a color display. Items in the image 200 that are red indicate an area of the earth that the thermal band data indicates as hot (i.e., above a predefined average temperature value). Blue indicates cold (i.e., below a predefined average temperature value) and white indicates a mean or average temperature. It will be appreciated that one can alter the algorithms of the present invention depending upon the type of thermal imaging the user desires. For example, if one desires to show blue as hot and red as cold, then one can alternate how the thermal band data and pan band data are used to generate colors on the display (FIG. 4). Also, the images may be manipulated by manually manipulating the luminance and intensity levels. It will be appreciated that other color bands may be used.

It will be appreciated that the pan band data can be corrected or sharpened by any of a variety of algorithms. For example, EQUATION (3) below illustrates an exemplary formula for correcting the pan band power.

$$\text{Pan Corrected Power} = \frac{\left[(p2+p3+p4)\times 2 - p3\times\left(\frac{g3v}{w3v}+\frac{g2v}{w3v}\right) - p4\times\left(\frac{g3v}{w4v}\right) - p2\left(\frac{g2v}{w2v}+\frac{g1v}{w2v}\right) - p1\times\frac{g1v}{w1v}\right] \times p\ pan}{(p2+p3+p4)\times 2} \quad (3)$$

Where
p1=multispectral power in band 1 (blue);
p2=multispectral power in band 2 (green);
p3=multispectral power in band 3 (red);
p4=multispectral power in band 4 (NIR);
p pan=multispectral power in band 8 (panchromatic);
w1v=difference between the wavelength lower limit for multispectral band 1 and the wavelength upper limit for multispectral band 1;
w2v=difference between the wavelength lower limit for multispectral band 2 and the wavelength upper limit for multispectral band 2;
w3v=difference between the wavelength lower limit for multispectral band 3 and the wavelength upper limit for multispectral band 3;
w4v=difference between the wavelength lower limit for multispectral band 4 and the wavelength upper limit for multispectral band 4, g1v=difference between the wavelength lower multispectral band 2 and the wavelength upper multispectral band 1;

g2v=difference between the wavelength lower multispectral band 3 and the wavelength lewef upper multispectral band 2; and g3v=difference between the wavelength lower multispectral band 4 and the wavelength upper multispectral band 3.

The pan correction equation (3) subtracts out average power values of the gaps from the total pan power.

It will be appreciated that the present invention can operate in real-time, thereby producing sharpened images at video speed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for generating a color array based on thermal band data, the method comprising:
   receiving an array of pan band data including units of data, the pan band data being converted to a power format;
   receiving an array of thermal band data including units of data, the thermal band data being converted to a temperature format; and
   generating a color array including units of data, each unit having red, green, and blue values,
   wherein generating the color array is based on the received arrays of the pan band data and the thermal band data.

2. The method of claim 1, wherein generating a color array includes generating a red value for each unit by adding a value of each corresponding unit in the pan band data to a value of each corresponding unit in the thermal band data.

3. The method of claim 2, wherein generating a color array includes generating green and blue values for each unit by determining a mean temperature value for the received thermal band data and adding a value of each corresponding unit in the pan band data to the determined mean temperature value.

4. The method of claim 2, wherein generating a color array includes generating green and blue values for each unit by determining an average temperature value for the received thermal band data and adding a value of each corresponding unit in the pan band data to the determined mean temperature value.

5. The method of claim 1, further comprising generating an image based on the generated color array.

6. The method of claim 5, further comprising displaying the generated image on a display device.

7. The method of claim 5, further comprising printing the generated image on a printing device.

8. The method of claim 1, further comprising converting the received thermal band data into a temperature format, wherein generating the color array is based on the temperature formatted thermal band data.

9. The method of claim 8, further comprising changing spatial resolution of the temperature formatted thermal band data to match spatial resolution of the received pan band data.

10. The method of claim 1, further comprising converting the received pan band data into a radiance format and converting the radiance formatted pan band data into a power format.

11. The method of claim 10, wherein converting the radiance formatted pan band data into a power format is based on bandwidth parameters of the pan band data.

12. A computer-based system for generating a color array based on thermal band data, the system comprising:
   a sensor including:
      a first component for receiving an array of pan band data including units of data, the pan band data being in power format; and
      a second component for receiving an array of thermal band data including units of data, the thermal band data being in a temperature format; and
   a processor including:
      a third component for generating a color array based on the received arrays of the pan band data and the thermal band data,
      wherein the color array includes units of data, each having red, green, and blue values.

13. The system of claim 12, wherein the third component generates a red value for each unit by adding a value of each corresponding unit in the pan band data to a value of each corresponding unit in the thermal band data.

14. The system of claim 13, wherein the third component further generates green and blue values for each unit by determining a mean temperature value for the received thermal band data and adding a value of each corresponding unit in the pan band data to the determined mean temperature value.

15. The system of claim 13, wherein the third component further generates green and blue values for each unit by determining an average temperature value for the received thermal band data and adding a value of each corresponding unit in the pan band data to the determined mean temperature value.

16. The system of claim 12, wherein the processor further includes a fourth component for generating an image based on the generated color array.

17. The system of claim 16, further comprising a display device for displaying the generated image.

18. The system of claim 12, wherein the second component converts the received thermal band data into a temperature format, and wherein the third component generates the color array based on the temperature formatted thermal band data.

19. The system of claim 18, wherein the second component changes spatial resolution of the temperature formatted thermal band data to match spatial resolution of the received pan band data.

20. The system of claim 12, wherein the first component converts the received pan band data into a radiance format and converts the radiance formatted pan band data into a power format.

21. The system of claim 20, wherein the first component converts the radiance formatted pan band data into a power format based on bandwidth parameters of the pan band data.

22. A method for generating an image based on thermal band data, the method comprising:
   receiving an array of pan band data including units of data in a first resolution;
   converting the received pan band data into a radiance format;
   converting the radiance formatted pan band data into a power format;

receiving an array of thermal band data having units of data in a second resolution;

converting the received thermal band data into a temperature format;

changing the resolution of the temperature formatted thermal band data to match the resolution of the received pan band data;

generating a color array based on the received array of the pan band data and the array of the changed thermal band data, the color array including units, each unit having red, green, and blue values; and generating an image based on the generated color array.

23. The method of claim 22, wherein generating a color array includes generating a red value for each unit by adding a value of each corresponding unit in the pan band data to a value of each corresponding unit in the thermal band data.

24. The method of claim 23, wherein generating a color array includes generating green and blue values for each unit by determining a mean temperature value for the received thermal band data and adding a value of each corresponding unit in the pan band data to the determined mean temperature value.

25. A computer readable medium encoded with a computer program product for performing the method of claim 24.

26. The method of claim 23, wherein generating a color array includes generating green and blue values for each unit by determining an average temperature value for the received thermal band data and adding a value of each corresponding unit in the pan band data to the determined mean temperature value.

27. The method of claim 26, further comprising displaying the generated image on a display device.

28. A computer readable medium encoded with a computer program product for performing the method of claim 27.

29. A computer readable medium encoded with a computer program product for performing the method of claim 26.

30. A computer readable medium encoded with a computer program product for performing the method of claim 22.

31. A method for generating a color array based on thermal band data, the method comprising:

receiving an array of pan band data including units of data from a LANDSAT system, the pan band data being converted to a power format;

receiving an array of thermal band data including units of data from the LANDSAT system, the thermal band data being converted to a temperature format; and generating a color array including units of data, each unit having red, green, and blue values, wherein generating the color array is based on the received arrays of the pan band data and the thermal band data.

32. A system for generating a color array based on thermal band data, the system comprising:

a receiver including:

a first component for receiving an array of pan band data including units of data from a LANDSAT system, the pan band data being in power format; and a second component for receiving an array of thermal band data including units of data from the LANDSAT system, the thermal band data being in a temperature format; and a processor including:

a third component for generating a color array based on the received arrays of the pan band data and the thermal band data, wherein the color array includes units of data, each having red, green, and blue values.

* * * * *